No. 881,290. PATENTED MAR. 10, 1908.
W. BEILKE.
FRICTION COUPLING.
APPLICATION FILED FEB. 5, 1907.

2 SHEETS—SHEET 1.

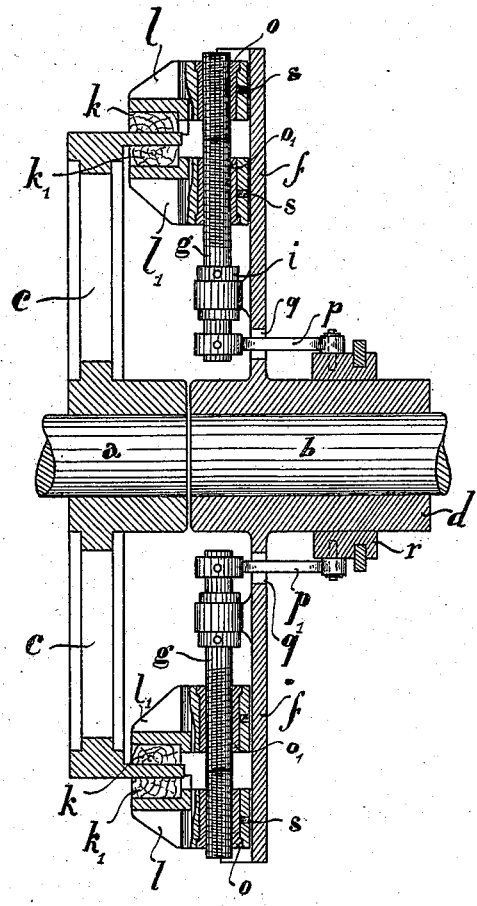

UNITED STATES PATENT OFFICE.

WILHELM BEILKE, OF CHARLOTTENBURG, GERMANY.

FRICTION-COUPLING.

No. 881,290.  Specification of Letters Patent.  Patented March 10, 1908.

Application filed February 5, 1907. Serial No. 355,792.

*To all whom it may concern:*

Be it known that I, WILHELM BEILKE, a civil engineer, and a subject of the German Emperor, and a resident of 3 Herderstrasse, in the city of Charlottenburg, near Berlin, Kingdom of Prussia, and German Empire, have invented a certain new and useful Friction-Coupling, of which the following is a specification.

This invention has reference to friction couplings having screw spindles radially arranged to the shafts to be coupled and clamping jaws which are to press uniformly from both sides against a coupling-ring. In the couplings of this kind, as heretofore known, an exact adjustment of the clamping jaws in relation to each other or a subsequent readjustment or displacement of the same was not possible or could be effected with great difficulty only, especially in the case of irregular wear of the clamping chucks.

By means of this invention the readjustment of the clamping jaws with uniform or irregular wear of the clamping chucks in very wide limits is accomplished in a very easy manner by providing the two threaded ends of the spindle with special journaling boxes, which are independent of each other and which after the release of any kind of suitable locking device, such as a set screw, will allow of adjustment and displacement.

Figure 1:
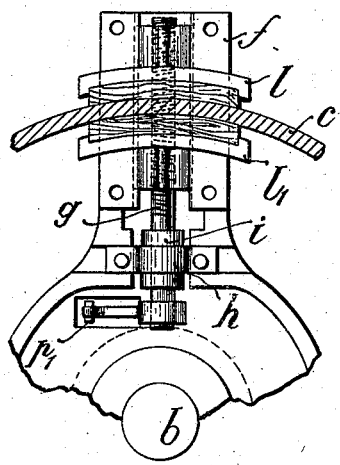
Figure 2:
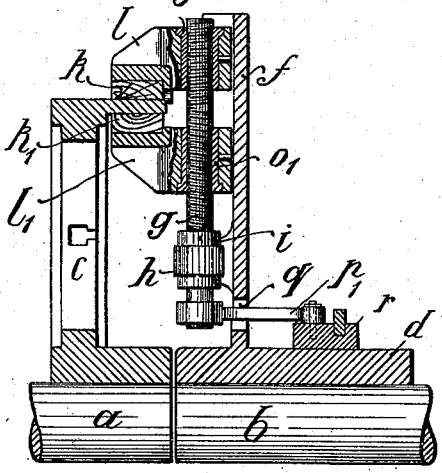
Figure 3:
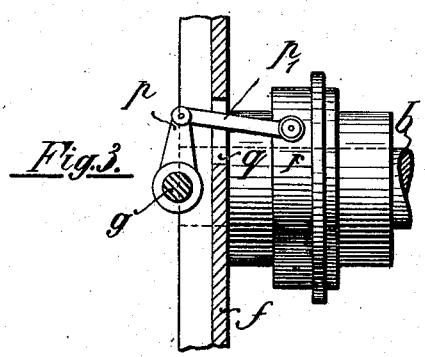

Figure 1 shows one arm of the coupling cross in front view, Fig. 2 a longitudinal section of the same and a sector of the coupling-ring, Fig. 3 is a top plan view of the regulating lever mechanism, Fig. 4 is a longitudinal section of a complete coupling with two radial spindles at least.

$a$ and $b$ are the two shaft ends to be coupled together. Upon the shaft-end $a$ the ring shaped disk $c$ is mounted which constitutes one member of the coupling and upon the shaft-end $b$, the hub $d$ is arranged with the vertical coupling cross $f$. Upon this coupling cross $f$, the screw spindle $g$ is turnably mounted in a journal $h$ being secured against displacement in the longitudinal direction by a ring shaped washer $i$. The screw spindle $g$ is provided with right and left hand threads and upon said spindle the annular pieces $l$ and $l'$ are mounted which are provided with the clamping jaws $k$, $k'$ and which are to be displaced in relation to each other by the rotation of the spindle $g$. In the vertical bores of the annular pieces $l$ and $l'$ the box-shaped female members $o$ and $o'$ are mounted, which are secured against twisting movement by small screws $s$ and which are indicated in section in Figs. 2 and 4. After loosening the said small screws $s$, the female members $o$ and $o'$ may be rotated along the spindle, for the purpose of being able to readjust the clamping jaws or any one of the same, in case of irregular wear of the wooden chucks. The adjustment of the clamping jaws in relation to each other may be effected by means of a system of levers $p$, $p'$, of which the lever $p'$ passes through an opening $q$ of the coupling cross and is pivoted to an adjusting ring $r$, displaceably arranged upon the hub $d$. When the clamping chucks $k$, $k'$ are worn uniformly the readjustment of the clamping jaws may be effected on the spindle by altering the point of attachment of the lever $p$ (see Fig. 3) upon the spindle $g$. Any unintentional disengagement of the coupling is prevented, in view of the screw spindles producing a braking action.

The particular way of mounting the spindle on the coupling cross, as well as the system of levers for the adjustment and change of position of the screw spindles do not constitute subjects of the present invention.

What I claim and desire to secure by Letters Patent of the United States is:—

In a friction-coupling, comprising right and left handed screw-spindles turnably journaled in a coupling cross and radially arranged to the shafts to be coupled a journaling box, independently adjustable, on each of the two thread-parts of each spindle, clamping pieces with jaws facing each other to the inside on each of the said boxes, a coupling-ring between the said jaws, means for rotating the screw-spindles all together, substantially as and for the purpose described.

In testimony whereof I have signed my name to this specification in the presence of two subscribing witnesses.

WILHELM BEILKE.

Witnesses:
 OSKAR ARENDT,
 WOLDEMAR HAUPT.